US012603072B2

(12) United States Patent
Smith

(10) Patent No.: US 12,603,072 B2
(45) Date of Patent: Apr. 14, 2026

(54) EASY APPLICATION HARMONICA HOLDER

(71) Applicant: Gregory Smith, Edgewood, MD (US)

(72) Inventor: Gregory Smith, Edgewood, MD (US)

( * ) Notice: Subject to any disclaimer, the term of this patent is extended or adjusted under 35 U.S.C. 154(b) by 168 days.

(21) Appl. No.: 18/485,399

(22) Filed: Oct. 12, 2023

(65) Prior Publication Data

US 2025/0124901 A1 Apr. 17, 2025

(51) Int. Cl.
*G10G 5/00* (2006.01)

(52) U.S. Cl.
CPC .................................... *G10G 5/005* (2013.01)

(58) Field of Classification Search
CPC ................................. G10G 5/005; G10G 5/00
See application file for complete search history.

(56) References Cited

U.S. PATENT DOCUMENTS 4,212,219 A * 7/1980 Hubbard .................. G10G 5/00 84/723
4,397,213 A * 8/1983 Hubbard .................. G10D 7/14 84/DIG. 14
4,497,234 A 2/1985 Strnad
4,541,321 A 9/1985 Miller
5,479,841 A 1/1996 Garrett
7,091,408 B2 8/2006 Thibodeau
8,362,346 B1 1/2013 Prozinski
8,993,864 B1 3/2015 Cramer
2013/0233146 A1 9/2013 Applegate
2014/0053706 A1 * 2/2014 Quealy .................... G10D 7/14 381/118

* cited by examiner

*Primary Examiner* — Kimberly R Lockett

(57) ABSTRACT

The Easy application harmonica holder is a 1-piece harmonica holder that holds itself in place using leverage provided by the hook while engaged with the Microphone. It is placed over top of a microphone being supported by a microphone stand and microphone holder, that keeps the harmonica positioned directly in front of the microphone allowing the musician to play other handheld instruments, while playing the harmonica by mouth, simultaneously. The difference between this device, the Easy Application Harmonica Holder and prior harmonica holding devices is, it is 1-piece, and it does not require you to remove or add any parts or pieces to put it on the microphone or take it off. It mounts directly to the top of the microphone. It keeps the harmonica in place in a groove on the faceplate. It is limited to the popular raised-back-edge harmonicas. What makes this Harmonica Holder Unique from prior harmonica holders is, it uses no mechanical fasteners, screws, springs or clamps to hold it in place and uses no mechanical fasteners, brackets, springs or magnets to hold the harmonica in place.

5 Claims, 10 Drawing Sheets

EASY APPLICATION HARMONICA HOLDER

FIELD OF INVENTION

This invention is related to musicians who play musical instruments, such as a guitar and harmonica simultaneously, then switch back to using the same microphone for vocals. Harmonica players frequently need to change harmonicas to play in different keys. With the present invention being a Microphone Stand Mounted Harmonica Holder the Field of Prior arts search was in Classification 84-377/379 but not limited to.

BACKGROUND

Harmonica holders have been around for a long time. Most use Screws, Bolts, Brackets and magnets to mount to a microphone stand. They require 2 hands to apply and remove and are generally cumbersome. Then there is the neck supported harmonica holder (U.S. Pat. No. 1,734, 799—Nov. 5, 1929) used by generations of musicians. Again, cumbersome while using it and requires 2 hands to exchange harmonicas to a different key. There are many using springs, magnets, clamps and tighteners that require 2 hands to manipulate.

While prior devices have their purpose, another issue presented is having good position on the microphone. I have seen Joe Satriani actually duct tape harmonicas to the face of the microphone guaranteeing good placement. This is where the idea for this device came from.

Similarly related Patents and their attributes as listed.

U.S. Pat. No. 4,397,213—Aug. 9, 1983—Dana Hubbard—Harmonica Holder and Shroud

It's secured to the microphone using pipe clamps. It uses pressure rods to secure the harmonica Meaning it requires 2 hands to insert and remove the harmonica as it is held between the clamp.

U.S. Pat. No. 4,497,234 Feb. 5, 1985—Frank Strnad—Sound Attachment for Reed Instrument This Patent Claim is entirely on the insertion of a sound pickup (Microphone) that is clamped inside the sound housing that is bolted shut. It makes no reference to holding the Harmonica in place nor how to attach it to any stand or holder.

U.S. Pat. No. 4,541,321-Sep. 17, 1985—Robert Miner Jr.—Harmonica-To-Microphone Attachment Device The Harmonica is held between 2 pressure producing Clamps.

The microphone inserts into it and uses a pipe clamp to secure it to the microphone.

Though it's claimed to be 1 piece, the pipe clamp is required.

U.S. Pat. No. 5,479,841—Jan. 2, 1996—Robert Garrett-Free Standing Multi-Harp Holder—

The base itself is specially made to attach to standard microphone stand and then the microphone is inserted and held in place using U-Bolts. The harmonicas are inserted between 2 spring assisted pressure plates that can be pried apart to insert the harmonica, meaning, it requires 2 hands to insert and remove harmonicas.

U.S. Pat. No. 7,091,408—Aug. 15, 2006—Jerry Thibodeau—JRT Harmonica Holder

With the Components being PVC piping, improper alignment of performer to microphone and securing the base would make this difficult to use in a live performance. The Harmonica is held in place by disassembling the PVC piping, inserting the harmonica, then putting it back together, thus requiring 2 hands to perform that function.

U.S. Pat. No. 8,362,346 Jan. 29, 2013—Dan Prozinski—Harmonica Holder and Sound Baffle This uses a telescoping, articulating arm to attach to the Microphone stand, by mechanical means and positions the Harmonica holder in front of the Microphone. The harmonicas are held in place by inserting them into a slot that supports the harmonica by its left and right sides pushing the harmonica straight in. The sound baffle is designed to direct the sound to the microphone; however, it is not at an optimum angle to the microphone for sound reproduction. It also impedes the vocalist from getting close enough to the microphone. Both problems would have to be overcome by pushing the Microphone gain to the feedback limits.

US Patent #2013/0233146 Sep. 12, 2013—Gary Applegate—Hands-Free Harmonica Mounting System and Method of Use.

This Harmonica Holder claims to be 1 piece using no mechanical means. However, to mount the Harmonica Holder one must unscrew the microphone head, insert the device, then thread the microphone head back on securing the holder, mechanically. It does allow for both harmonica playing and vocal use simultaneously. The harmonica is held in place by either a magnet or Velcro. The magnet idea is genius. The downside in this Harmonica Holder is, it is not at an optimum angle to the microphone for sound reproduction. It also impedes the vocalist from getting close enough to the microphone because it hits them in the chin. Both problems would have to be overcome by pushing the Microphone gain to the feedback limits. I owned a similar device.

U.S. Pat. No. 8,993,864 Mar. 31, 2015—Mark Cramer—Support Device for Harmonica and Microphone This harmonica and Microphone holder uses an arm that mechanically attaches to the microphone stand. It attaches a second microphone specifically for harmonicas keeping the vocal microphone open for vocals. It holds the harmonica using a spring-loaded clamp, meaning it would require 2 hands to insert and remove the harmonica.

The Rackit Custom Microphone—By Blowsmeaway Productions—Geyserville, California. Came on the market around 2018 though recently discovered by me, sold as a custom microphone for harmonicas. Has no associated patents. The microphone is inserted into the holder and uses screws to keep it engaged. The harmonica is inserted into the holder, and it then mounts to a neck supported harmonica holder. You would have to remove the screws to remove the device. This device is very similar to patent Ser. No. 13/590,334 by James Quealy.

The Battleplan Bullet Buddy—By Battle Plan, England—They sell a harmonica microphone clip that came on the market around 2018 though there is no timeline on the Harmonica Holding Bullet Buddy. Has no associated patents. The holder is inserted onto the microphone and uses screws to keep it secured. The harmonica is inserted into the holder, and it then mounts to a neck supported harmonica holder. You would have to remove the screws to remove the device. Now being sold on Amazon.

BRIEF SUMMARY

This device, the Easy Application Harmonica Holder, allows the user to apply it to the microphone quickly and remove it quickly with the use of 1 hand. This device has a groove in the faceplate to slide in place popular raised back-edge diatonic harmonicas. The harmonica simply slides into the groove and out as easy making swapping to a different key quick and easy. The device is 1 piece and has no moving parts. This device does limit the user as it does not allow the user to play harmonica and sing vocals simultaneously. It would require the user to remove the harmonica holder to use the microphone for vocals.

DETAILED DESCRIPTION

This one-piece device, the Easy Application Harmonica Holder, comprising of multiple attributes to use, allows the user to apply it to the microphone quickly by setting over top of the microphone and remove it quickly by lifting it off, with the use of 1 hand. It is applied over-top of the microphone. It stays in place by using its own weight and a hook at the back of the holder—for providing leverage against the bottom portion of the microphone and with the faceplate back resting against the front of the microphone. This device has a groove in the faceplate front to slide in place popular raised back-edge diatonic harmonicas. The harmonica simply slides into the groove and out as easy making swapping to a different key quick and easy. The Easy application harmonica holder has no moving parts, screws, springs or metal. The back of the faceplate is concaved to mimic a harmonica player cupping the microphone with their hand. Though drawings show it to be mounted to a bullet style microphone, it can be modified to fit other microphone styles.

The elements Listed in drawings.

- The Microphone Stand (18)—Not part of the Harmonica Holder but is used to support the Microphone holder. The Microphone Holder (17)—Not part of the Harmonica Holder but is used to support the Microphone. The Microphone (16)—Not part of the Harmonica Holder but is used to support the Easy Application Harmonica holder. The Harmonica (15)—Not part of the Harmonica Holder but is the instrument that this is used to play.

These listed below are all attributes of the one-piece Easy application Harmonica Holder (10). FIG. 7

- Faceplate Front (02)—Is the Front of the Harmonica Holder that has a groove to slide the harmonica into and hold the harmonica in place as shown in FIG. 1.
- Faceplate Back (08)—Is the back side of the faceplate that engages the front of the Microphone grill shown in FIG. 4.
- The Groove (01)—The Groove is part of the faceplate and is where the harmonica slides in horizontally shown in FIG. 1.
- The Sound Hole (03)—Allows Sound to pass from the Faceplate to the Cradle area where the Microphone is shown in FIG. 1.
- The Cradle area (05)—Is behind the faceplate and is the area where the microphone sits when the holder is placed over it shown in FIG. 3.
- The Hook (04)—Is the Hole or hook at the back of the Easy application Harmonica holder that goes around the back of the Microphone. Shown in FIG. 2. The hook can be modified during production to accommodate different microphone types.
- Raised edges on top of holder (06)—The raised edges are to strengthen the Plastic or resin housing of the cradle area. Shown in FIG. 2.

How to Use the Easy Application Harmonica Holder

The person who is going to play the harmonica and another handheld instrument such as a guitar, simultaneously, shown in FIG. 9, would stand facing the Microphone stand (18) that has a microphone holder (17), holding a microphone (16). The person would hold the Easy Application harmonica holder (10), with the raised edges (06) showing on top at a 45-degree angle over the microphone, with the hook (04) down and the Faceplate Front (02) up. Place the hook (04) over the back part or tail piece of the microphone (16), keeping it engaged while moving the holder Faceplate (2) in a downward motion, into a horizontal position. The Cradle area (05) of the holder is then over top of the microphone 16) and the Faceplate Back (08) is resting against the front grill of the microphone (16). The hook (04) in the back creating leverage by applying upward force to the bottom of the microphone (16) and the weight of the holder giving downward force, keep it in place as shown in FIG. 5. The person then uses 1 hand to slide a harmonica (15) horizontally into the groove (01) in the Faceplate Front (02) as shown in FIG. 10 from left to right. The harmonica sound, when played, is carried through the sound hole (03) in the faceplate (02) as seen in FIG. 1, between the harmonica (15) and the microphone (16). The person who is playing another instrument, such as a guitar, can then lean in and play harmonica (15) by mouth without using their hands. If the person needs to change harmonicas, the said harmonica (15) in place can be removed by sliding it out of the groove (01), with 1 hand and insert the next harmonica (15) following the previous instructions. If the person decides to remove the holder (10) from the microphone (16), they would with one hand grasp the faceplate (02), lift the faceplate (02) upward into a 45-degree angle, disengaged the hook (04) by lifting in a backwards motion. The microphone (16) can now be used for vocals. With the harmonica holder (10) in place, the person would not be able to use the microphone (16) for vocals.

How the Easy Application Harmonica Holder is made—It can be made of Clear Epoxy Resin using a mold or Plastic mold injection process such as acrylic or polyethylene.

Figure 1:
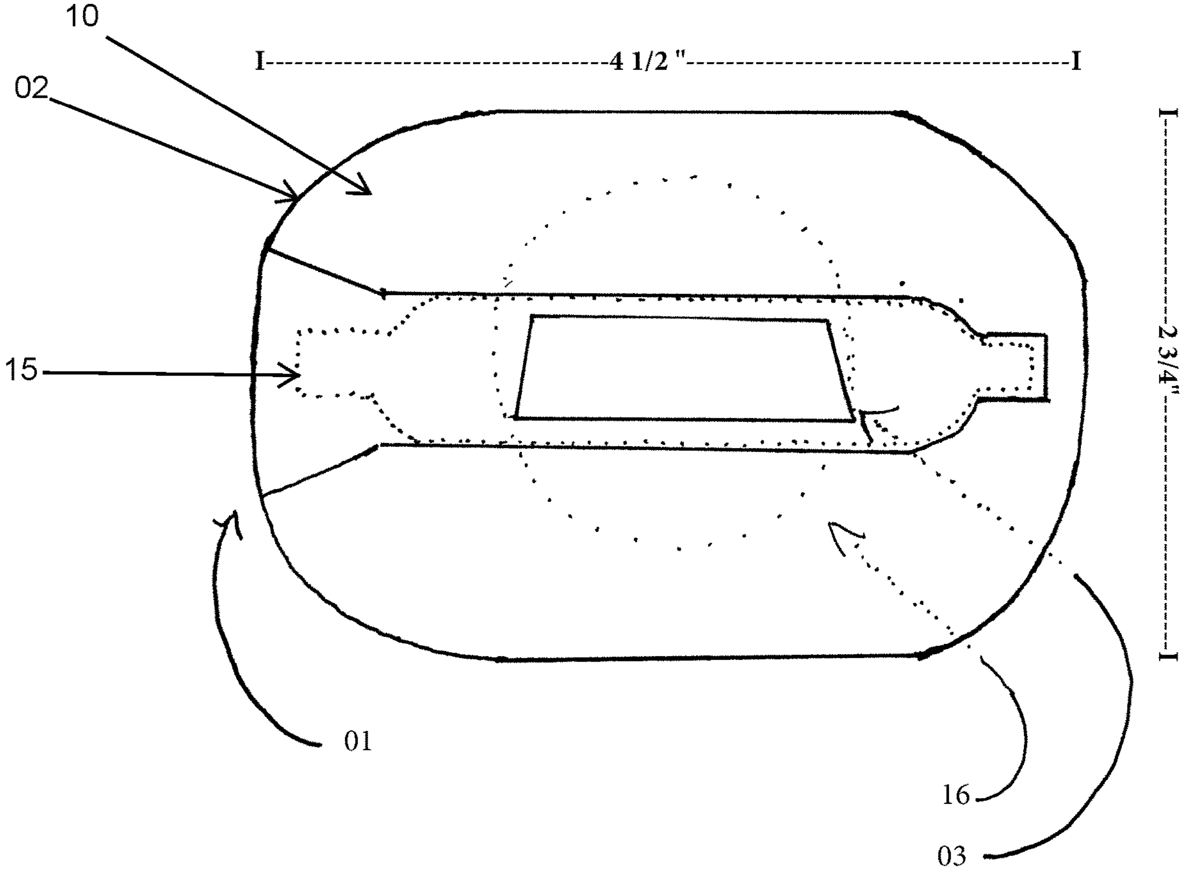
FIG. 1—Drawing-Front View—The Harmonica Holder (10) Faceplate Front—(02) The Groove (01) where the harmonica (15) (shown in ghost lines) slides into the Faceplate front (02). The Microphone (16) (shown in ghost lines) is behind faceplate Back (Not shown); The harmonica holder Cradle area (05) (not shown) is resting on top of the microphone (16). A sound hole (03) in faceplate (02) to allow harmonica (15) sound to pass thru to the microphone (16).
Figure 2:
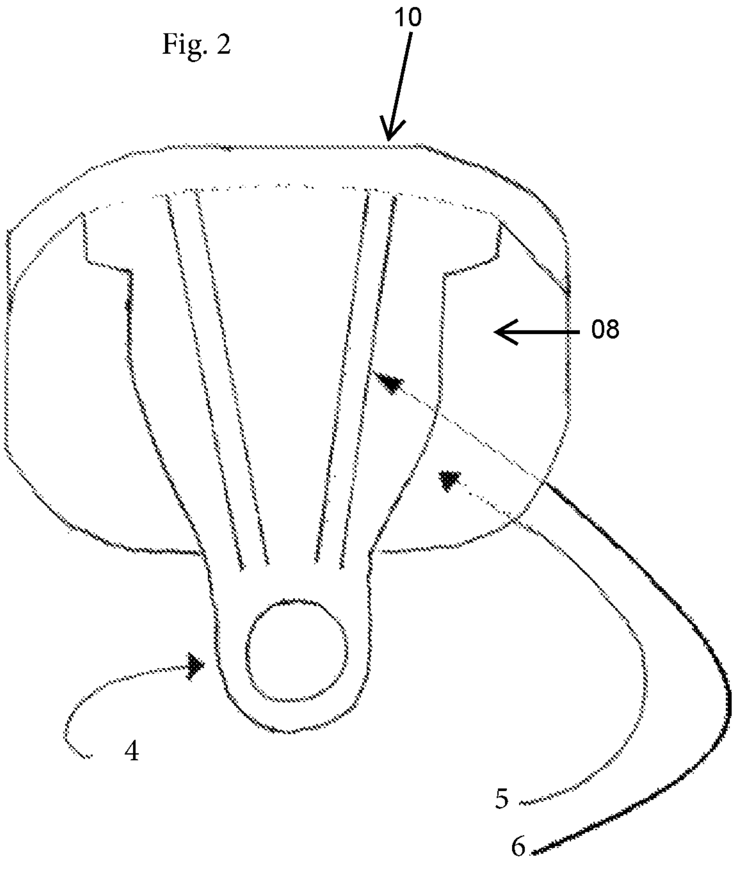
FIG. 2—Drawing-Top/Back View—The harmonica holder (10) and faceplate back (08). The Hook (04) in back of holder used as leverage point to keep holder on the microphone (16). The Cradle area (05) under holder (10) where microphone (16) is. Raised edges (06) on top to strengthen support of holder.
Figure 3:
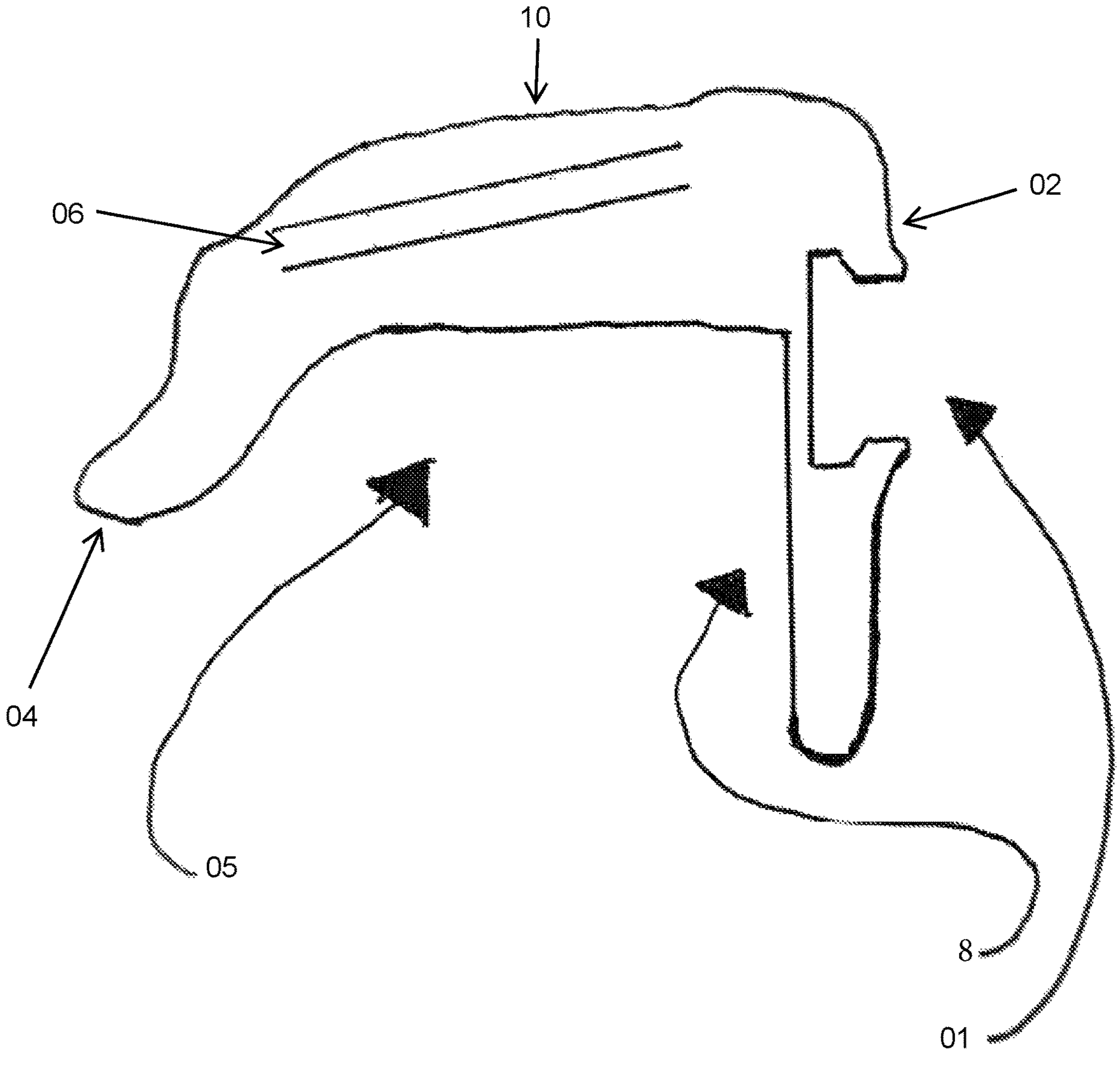
FIG. 3—Drawing-Left Side View—The Harmonica Holder (10). The Cradle area (05) under holder where microphone (16) is. Faceplate back (08) is concaved to mimic cupping a microphone. The Groove (01) in faceplate front (02) where harmonica (15) (not shown) slides in. The Hook (04) in back of holder used as leverage point to keep holder on the microphone (16) (not shown). Raised edges (06) on top to strengthen support of holder.
Figure 4:
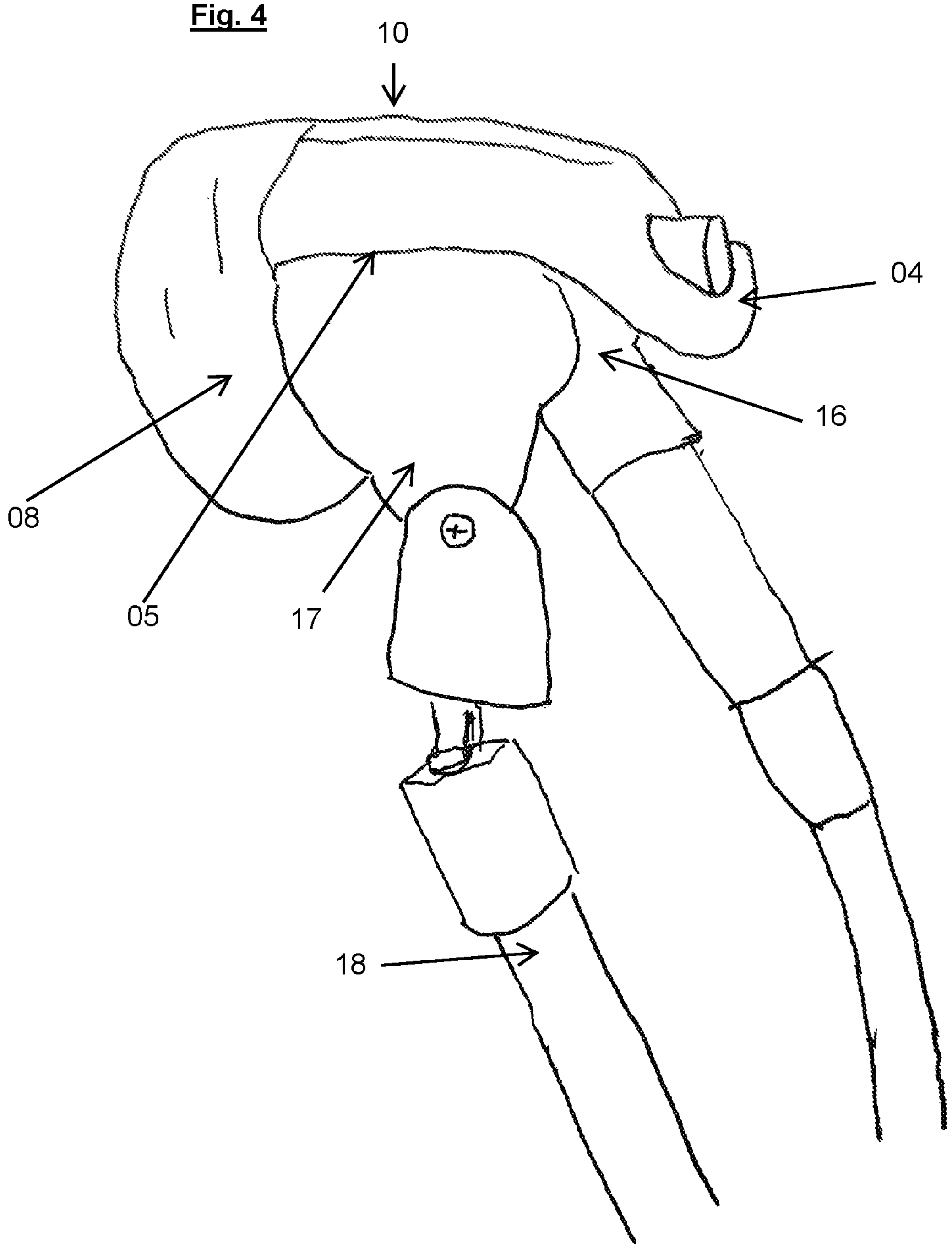
FIG. 4—Drawing-Back Right-side view—The Harmonica Holder (10) Cradle area (05) is resting on top of microphone (16). The Microphone (16) Is sitting on The microphone holder (17) attached to The microphone stand (18). The Faceplate back (08) is against the front of the Microphone (16)
Figure 5:
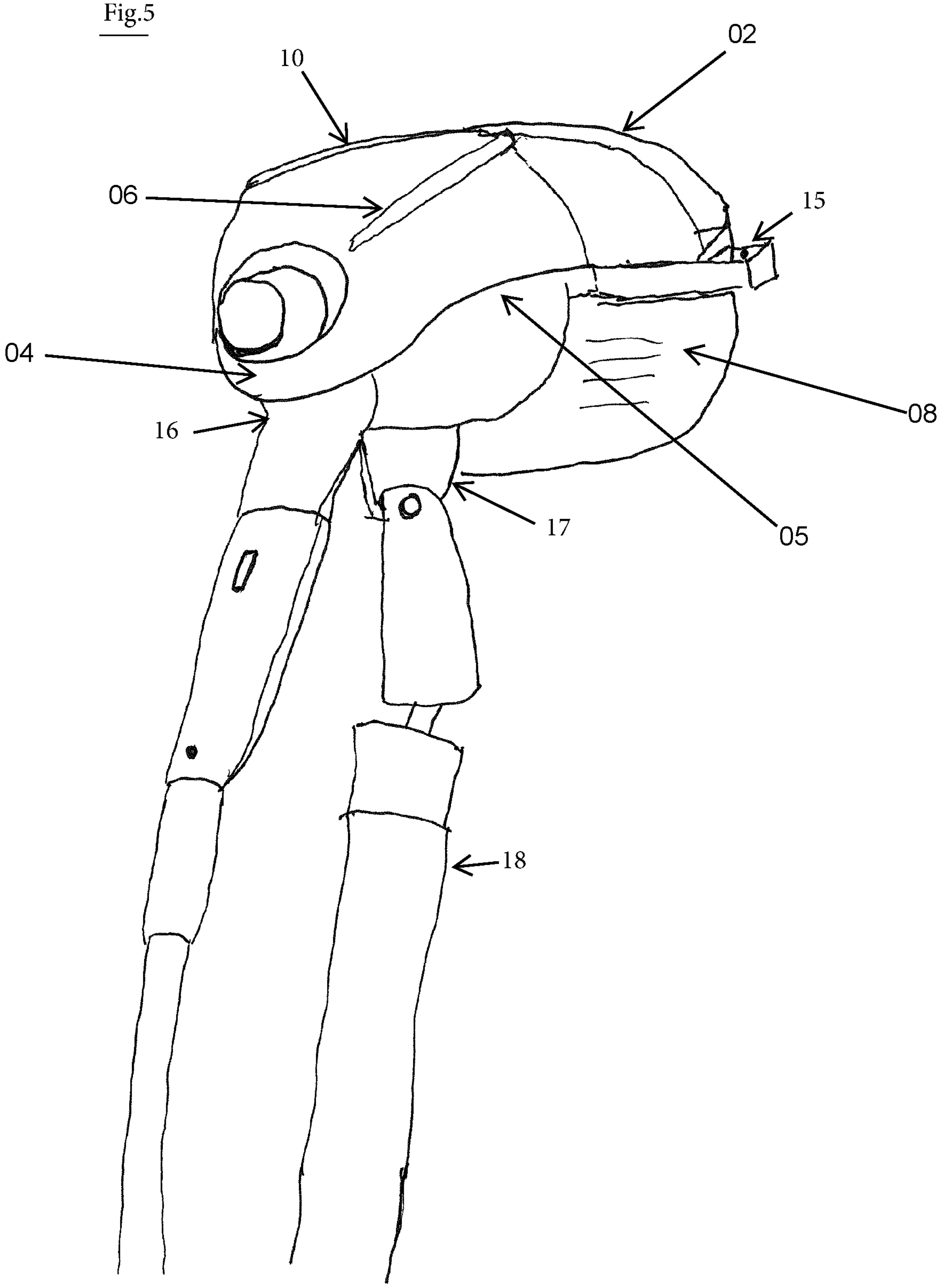
FIG. 5—Drawing-Back Left-side view—The Harmonica Holder (10) cradle area (08) is resting on top of microphone (16). A Harmonica (15) is mounted on Faceplate front (02) (which is facing away in this drawing) inside of the groove (01). The Microphone (16) is sitting in the microphone holder (17) attached to the microphone stand (18). The Hook (04) in back of holder used as leverage point to keep holder on the microphone (16) (not shown). Raised edges (06) on top to strengthen support of holder. Raised edges (06) on top to strengthen support of holder. The Faceplate back (08) is against the front of the Microphone (16)
Figure 6:
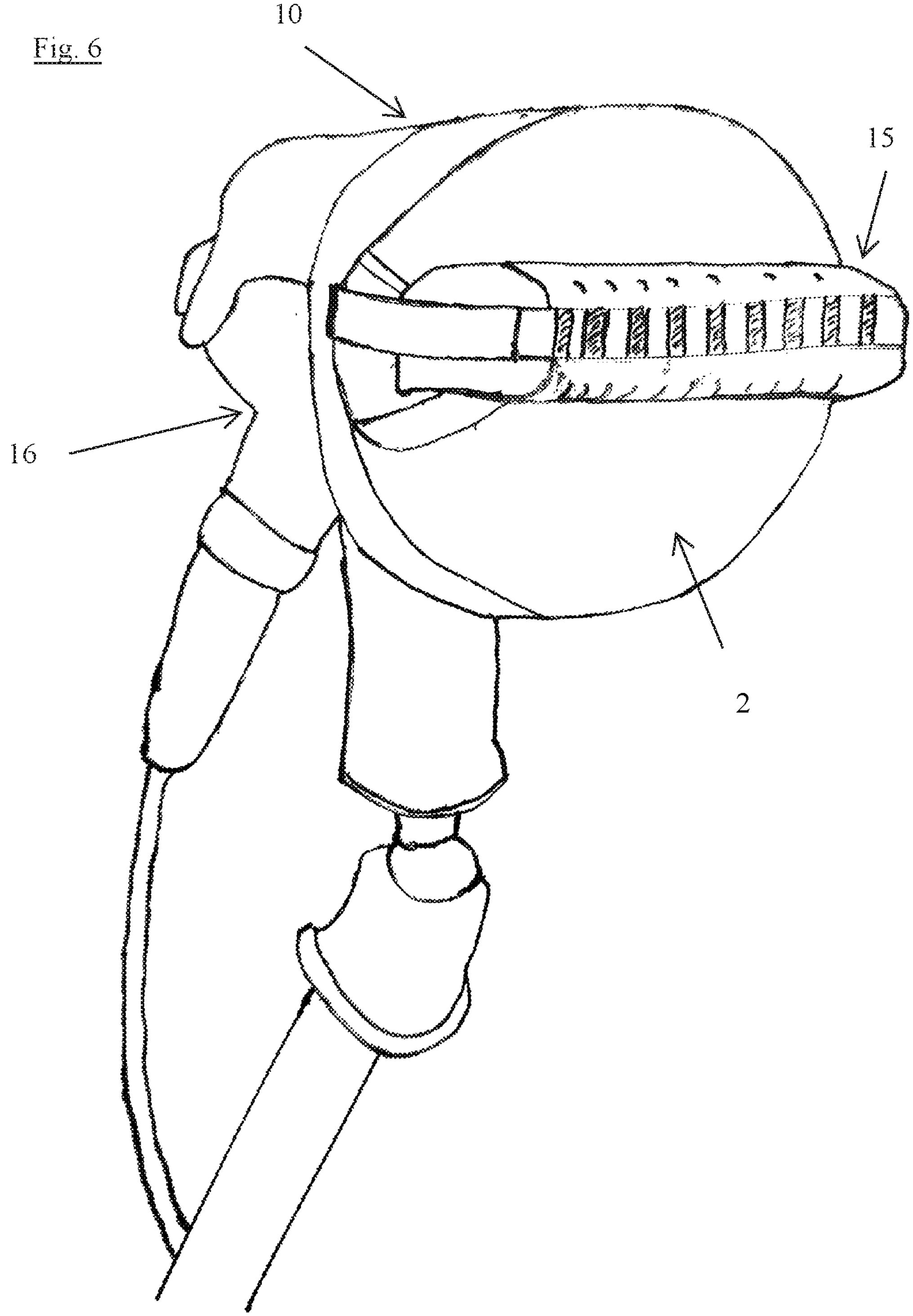
FIG. 6—Drawing-Front-Left View of Harmonica Holder with harmonica inserted.
Figure 7:
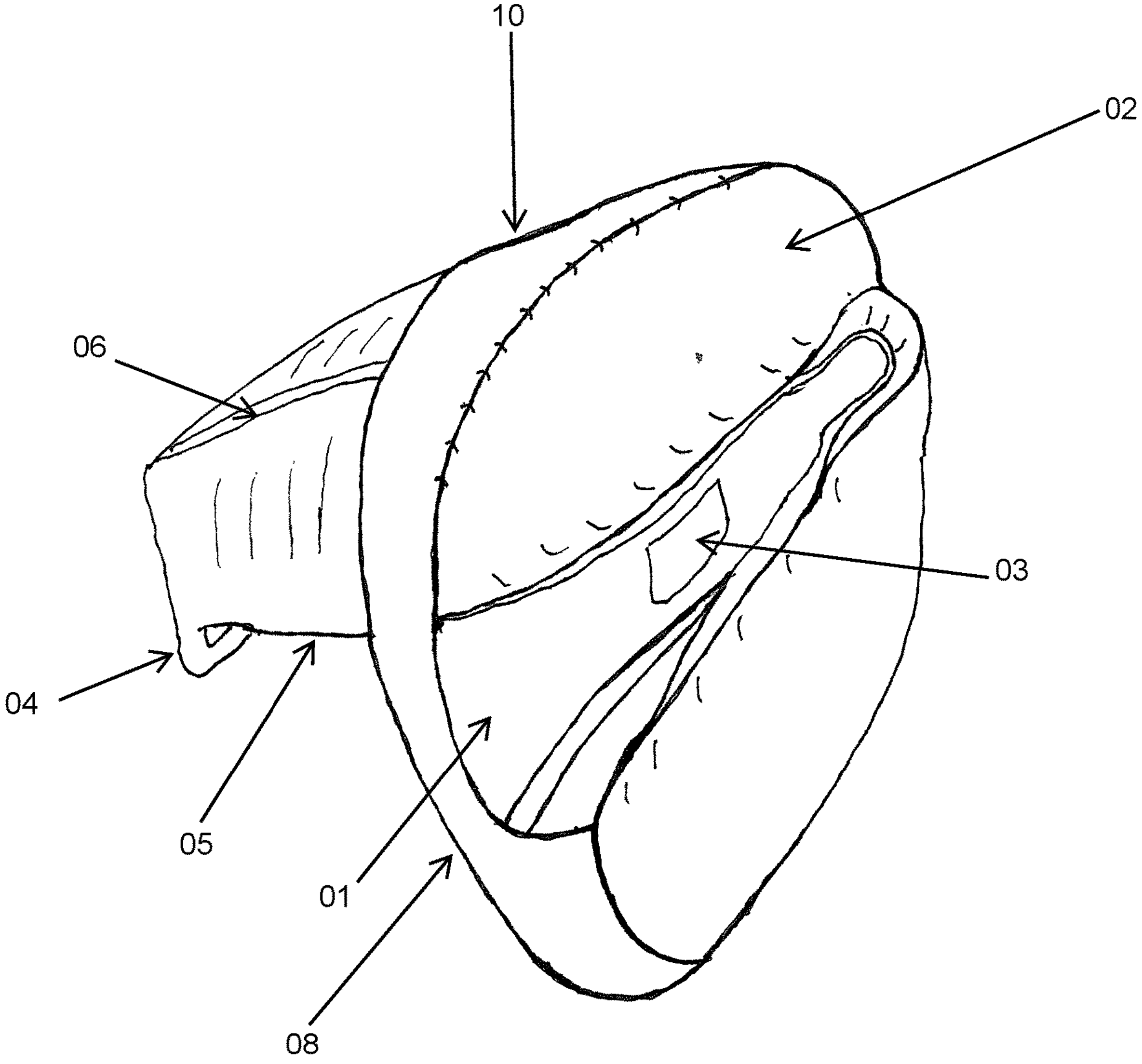
FIG. 7—Drawing-Front-Left View—This is showing the harmonica Holder (10) and its attributes, the Faceplate Front (02), the sound hole (03) where sound passes through, the Groove (01) where the harmonica (15) (not shown) slides in, the Hook (04) that that goes under the back of the microphone (16) (not Shown), the Cradle area (05) where the microphone (16) (not Shown) would be and the raised edges (06). Faceplate Back (08) facing away in drawing, would be against the front of the microphone (16) (not shown).
Figure 8:
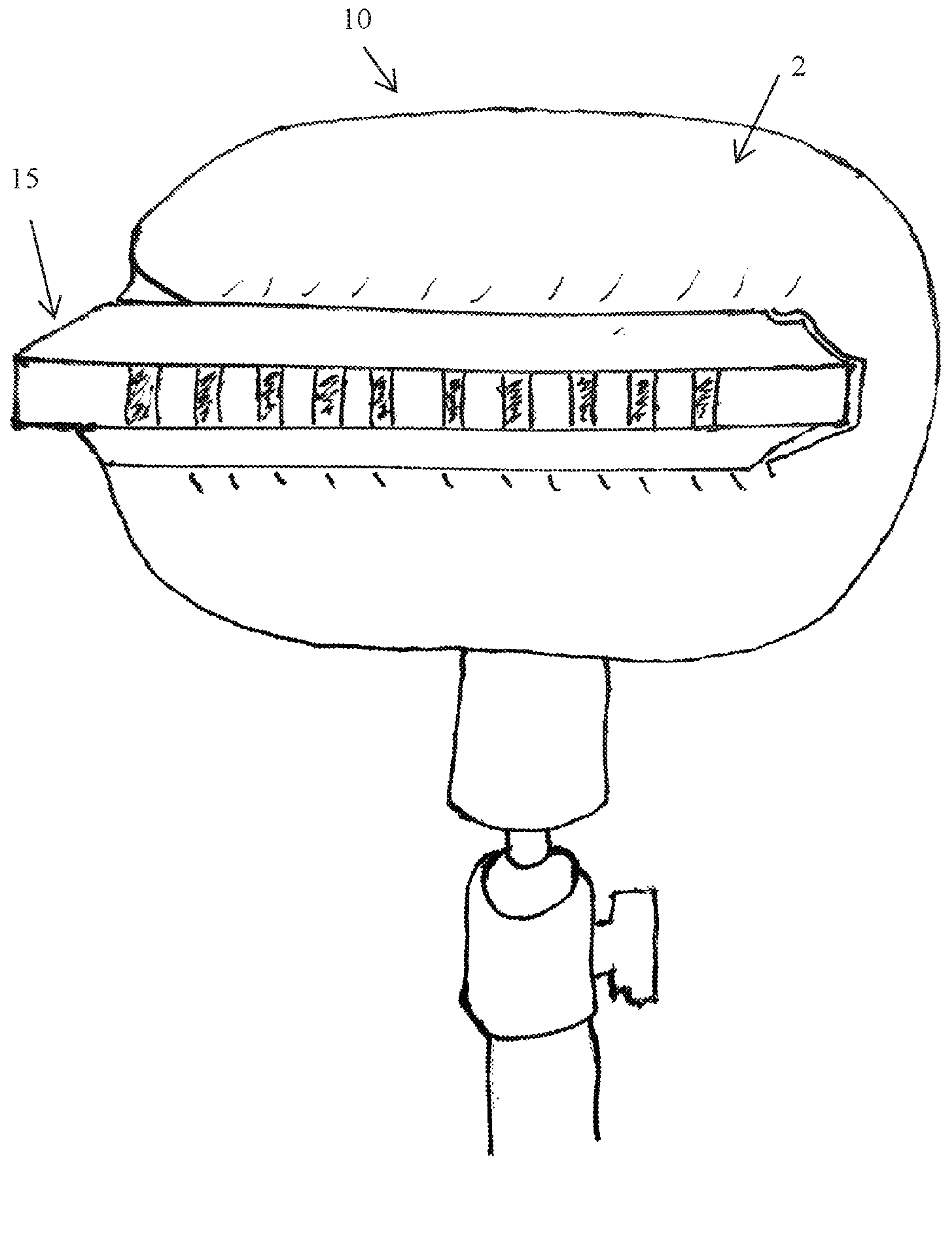
FIG. 8—Drawing Front View with Harmonica in place.
Figure 9:
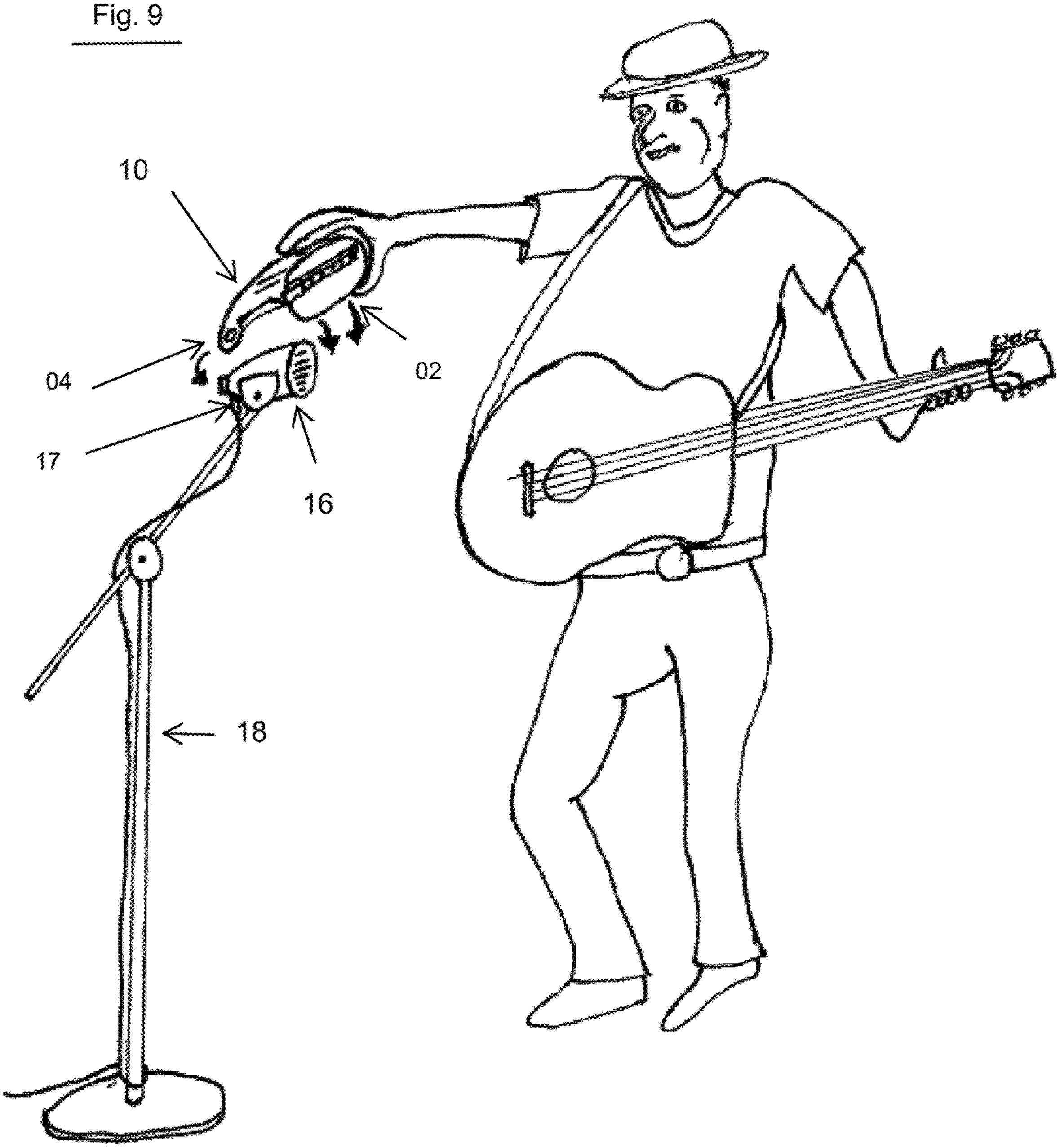
FIG. 9—Drawing-Person standing in front of Microphone stand (18) placing the Harmonica Holder (10) onto the Microphone (16) being supported by a stand (18).
Figure 10:
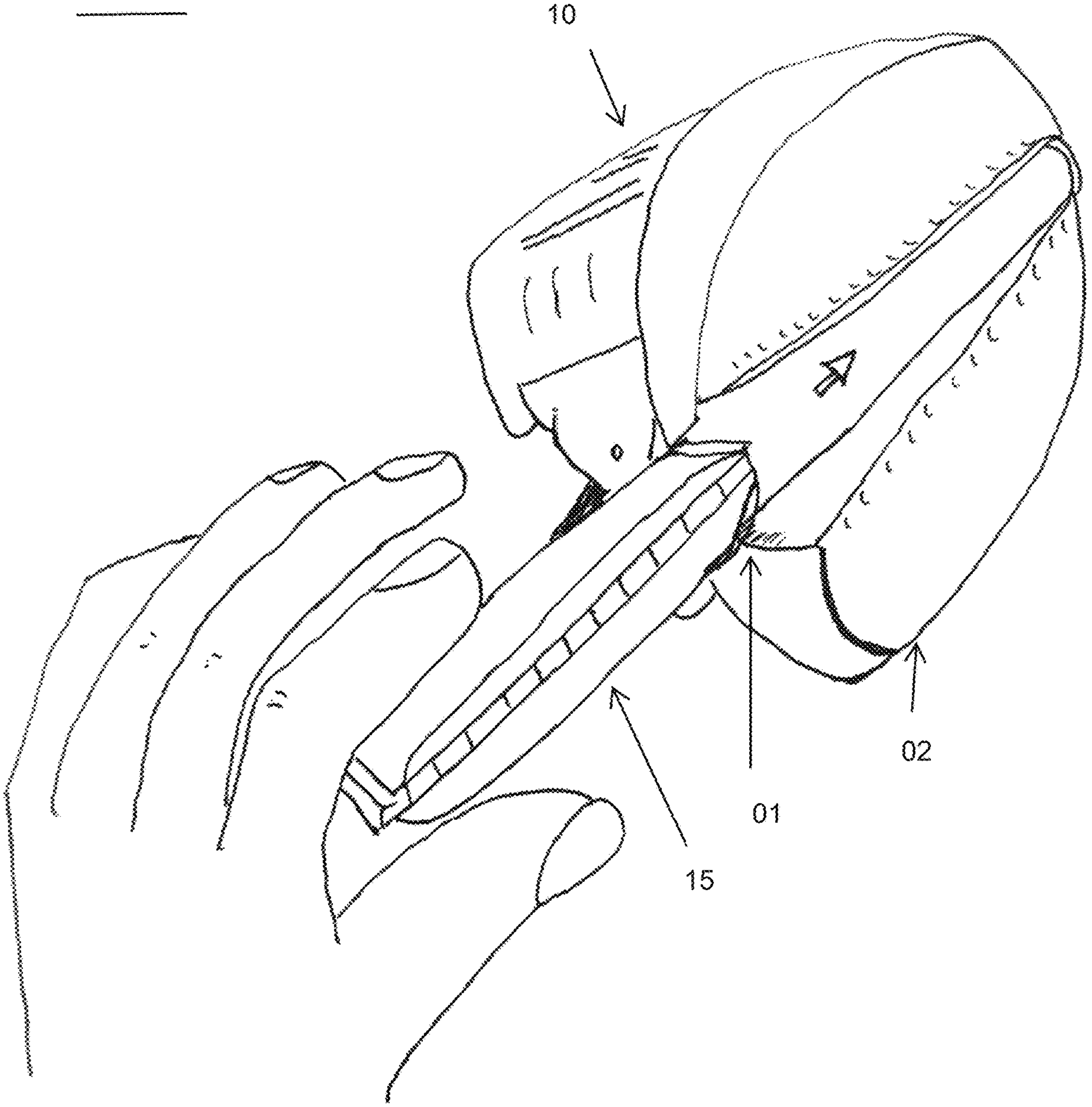
FIG. 10—Drawing-Harmonica (15) being inserted into the Groove (01) on the faceplate front (02).

The invention claimed is:

1. A harmonica holder comprising a solid piece of material, said harmonica holder having a concaved back and a cradle area that cradles and sits over the top of a microphone; wherein said harmonica holder further comprises a faceplate with a groove for holding and securing a harmonica; said harmonica holder further having a sound hole, wherein said sound holes allows sound to pass from said faceplate; and a hook for easily attaching and removing said harmonica holder from said microphone.

2. The harmonica holder as recited in claim 1 further comprising a unitary device, said unitary device comprising a front and back and a groove for holding said harmonica.

3. The harmonica holder as recited in claim 1, wherein said holder is placed over the microphone and is supported by a microphone stand.

4. The groove as recited in claim 1, wherein the harmonica slides in and out of the harmonica holder from left to right.

5. The harmonica holder as recited in claim 1, comprising a hook said capable of attaching to microphones of different styles.

* * * * *